United States Patent
Bloss et al.

(10) Patent No.: US 10,498,375 B1
(45) Date of Patent: Dec. 3, 2019

(54) PORTABLE RF RECEIVER MODULE AND PORTABLE ANTENNA ARRANGEMENT

(71) Applicant: Rohde & Schwarz GmbH & Co. KG, München (DE)

(72) Inventors: Martin Bloss, München (DE); Michael Fischlein, Singapore (SG); Kok Tat Lee, Singapore (SG); Qinghai Chen, Singapore (SG)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/032,221

(22) Filed: Jul. 11, 2018

(51) Int. Cl.
  *H04L 12/24* (2006.01)
  *H04B 1/18* (2006.01)
  *H04B 1/10* (2006.01)

(52) U.S. Cl.
  CPC .................................... *H04B 1/10* (2013.01)

(58) Field of Classification Search
  CPC ............ H01Q 1/241; H01Q 21/30; H01Q 3/04
  USPC .......... 455/69, 522, 77, 67.14, 189.1, 226.1; 341/155; 348/731
  See application file for complete search history.

(56) References Cited

U.S. PATENT DOCUMENTS

| | | | | |
|---|---|---|---|---|
| 3,931,578 A * | 1/1976 | Gittinger | ............... | H03D 7/163 455/189.1 |
| 5,604,925 A * | 2/1997 | O'Malley | ............... | H01Q 1/02 330/289 |
| 8,749,433 B2 * | 6/2014 | Hill | ....................... | G01S 5/0205 342/387 |
| 9,674,007 B1 * | 6/2017 | Wicker, Jr. | ........ | H04L 25/03019 |
| 2002/0047942 A1 * | 4/2002 | Vorenkamp | ............ | H04N 5/455 348/731 |
| 2004/0005871 A1 * | 1/2004 | Saito | ...................... | H01P 1/127 455/287 |
| 2005/0156775 A1 * | 7/2005 | Petre | ..................... | H03M 1/121 341/155 |
| 2007/0076827 A1 * | 4/2007 | Beamish | ............. | H04L 27/3809 375/345 |
| 2007/0207756 A1 * | 9/2007 | Qi | .......................... | H04B 17/20 455/226.1 |
| 2010/0194475 A1 * | 8/2010 | Okayama | ................. | H04B 1/18 330/151 |
| 2013/0288615 A1 * | 10/2013 | Anand | ................... | H01Q 1/241 455/77 |

(Continued)

FOREIGN PATENT DOCUMENTS

CN 106053962 A 10/2016

*Primary Examiner* — Tan H Trinh
(74) *Attorney, Agent, or Firm* — Westman, Champlin & Koehler, P.A.

(57) ABSTRACT

The invention relates to a portable radio frequency (RF) receiver module, the portable RF receiver module comprising: a standardized interface for receiving a RF signal, which comprises a RF connector and which is configured to allow as well an electrical connection and a mechanical quick attachment of the portable RF receiver module to a corresponding standardized interface of an antenna; a preselector circuit which is coupled to the standardized interface for receiving RF signals and which comprises a filter and a selection apparatus, wherein the selection apparatus is configured to allow a selection of a predefined filter characteristic of the filter and to filter out predefined frequency bands of the received RF signals. The invention further relates to a portable antenna arrangement.

19 Claims, 3 Drawing Sheets

(56) References Cited

U.S. PATENT DOCUMENTS

| | | | |
|---|---|---|---|
| 2014/0342675 A1* | 11/2014 | Massarella | H04W 52/42 |
| | | | 455/67.14 |
| 2015/0256272 A1* | 9/2015 | Weissman | H04B 17/13 |
| | | | 455/84 |
| 2017/0026771 A1* | 1/2017 | Shuang | H04S 7/306 |
| 2017/0163484 A1* | 6/2017 | Hou | H04B 1/0057 |
| 2017/0346578 A1* | 11/2017 | Sundararajan | H04B 17/318 |
| 2018/0062682 A1* | 3/2018 | Wloczysiak | H03F 1/56 |

* cited by examiner

US 10,498,375 B1

PORTABLE RF RECEIVER MODULE AND PORTABLE ANTENNA ARRANGEMENT

TECHNICAL FIELD

The invention relates to a portable RF receiver module for an antenna arrangement and a corresponding portable antenna arrangement.

TECHNICAL BACKGROUND

Although applicable in principal to any portable RF receiver module, the present invention and its underlying technical background will be hereinafter described in combination with a portable RF receiver for a directional antenna.

Directional antennae are formed in particular as portable devices which can be coupled to a suitable portable or stationary receiver. Those radio frequency (RF) receivers are configured to translate a received passive RF signal into a voltage signal. Chinese patent application CN 106053962 discloses such a RF receiver module for an antenna based on a radio wave environment testing. The RF receiver module comprises several channels comprising several low noise amplifiers that are configured to amplifying different noise signals differently. The RF receiver module further comprises a single high pass filter that is configured to filter out low-frequency interferences of the sensed noise signal.

SUMMARY OF THE INVENTION

Against this background, there is a need to provide a RF receiver that accommodates to the frequency characteristics of different noise sources.

The present invention solves this problem with a portable RF receiver module and with a portable antenna arrangement having the features of the independent claims.

The present invention provides according to a first aspect a portable radio frequency (RF) receiver module, the portable RF receiver module comprising: a standardized interface for receiving a RF signal, which comprises a RF connector and which is configured to allow as well an electrical connection and a mechanical quick attachment of the portable RF receiver module to a corresponding standardized interface of an antenna; a preselector circuit which is coupled to the standardized interface for receiving RF signals and which comprises a filter and a selection apparatus, wherein the selection apparatus is configured to allow a selection of a predefined filter characteristic of the filter and to filter out predefined frequency bands of the received RF signals.

The present invention provides according to a second aspect a portable antenna arrangement, the antenna arrangement comprising: at least one portable RF antenna which is configured to receive over the air (OTA) RF signals and which is having a first standardized interface for providing the received RF signals; and a portable RF receiver module comprising: a second standardized interface; a preselector circuit which is coupled to the second standardized interface for receiving the provided RF signal and which comprises a plurality of filter elements and a selection apparatus, wherein the selection apparatus is arranged and configured to allow a selection of at least one of the filter elements for attenuating out predefined portions of the received RF signal; wherein the portable RF receiver module is attached to the antenna and electrically connected to the antenna via their standardized interfaces.

The present invention provides a cost efficient modular concept which enables band-selective and direct measurement of interference signals using a portable RF receiver. The portable RF receiver enables a user in particular to select a predetermined frequency band or frequency band of interest and filter out the other frequencies. This enables the user to analyze a specific source of interference more efficiently and reliably, e.g. by analyzing a known or suspected interference signal.

During the measurement the user can, for example, switch to filters with different frequency response for analyzing the corresponding interference source. This makes the measurement very efficient and in addition very convenient for the user.

Furthermore, the portable RF receiver module can be attached directly (i.e. without any electrical lines) to and released from the portable antenna very quickly using a special standardized RF connector. This RF connector is used as well for the direct mechanical attachment of the RF receiver module directly to the antenna and for providing an electrical RF interface. This way, for example, one and the same portable RF receiver module can be attached to different portable RF antennae which is rather convenient for field test and measuring purposes.

Further aspects of the present invention are subject of the subclaims and the description referring to the drawings.

According to a further aspect, the RF module comprises a memory which is coupled to the standardized interface and/or to the preselector circuit. The memory is configured to store measurement specific information in connection with an RF measurement after the portable RF receiver module is connected to an antenna for frequency measuring purposes.

According to a further aspect, the preselector circuit comprises a filterbank having an array of bandpass filters. Typically, but not necessarily, each of the bandpass filters is having a different transfer function. The selection apparatus of the preselector comprises a switching circuit for selecting one or more of the bandpass filters in order to feed the received RF signal to the selected bandpass filters. The selection apparatus may be a multiplexer circuit or an array of controllable switches that are connected to the input and/or output terminals of the different bandpass filters.

According to a further aspect, the preselector circuit further comprises a measuring circuit. The measuring circuit is configured to selectively measure specific frequencies or frequency bands of the received RF signal. The selection apparatus is further configured to allow a selection of at least one of the predefined filter characteristics based on information of the measured specific frequency bands.

According to a further aspect, the preselector circuit comprises one or more tunable filters. A tunable filter may be employed instead of or in addition to a filterbank. A tunable filter allows simultaneous and independent tuning of the center wavelength and bandwidth of the filter. For example the frequency band of the tunable filter is set and controlled by a suitable controller.

According to a further aspect, the RF receiver comprises an amplifier circuit for amplifying the received RF signal. Preferably, the amplifier circuit is connected to the preselector circuit and comprises at least one low noise amplifier (LNA).

According to a further aspect, the amplifier circuit is tunable, for example by a suitable controller. A tuned amplifier is an electronic amplifier which includes bandpass filtering components within the amplifier circuitry. In particular, the gain, the noise and/or the frequency of the amplifier circuit are tunable.

According to a further aspect, the amplifier circuit is connected upstream of the preselector circuit. This way, the received signal is amplified prior to filtering it. For this purpose, according to a preferred embodiment, the amplifier circuit is connected directly to the input terminals of the preselector circuit. Additionally or alternatively, it may also be possible that the amplifier circuit is connected downstream of the preselector circuit for past-amplifying the filtered RF signal.

According to a further aspect, the RF receiver further comprises a switchable and controllable bypass circuit. This switchable bypass circuit is configured to bypass the preselector circuit if for example there is no need to filter the received RF signal. Additionally or alternatively, the switchable bypass circuit is configured to bypass the amplifier circuit.

According to a further aspect, the RF connector of the standardized interface is a coaxial RF connector.

According to a further aspect, the RF receiver modules further comprises a controller. The controller is configured to control operation of the devices and elements of the portable RF receiver module. In particular, the controller is connected with control terminals of the preselector circuit in order to switch the switching circuit. Additionally or alternatively, the controller is configured to control the bypass apparatus, the tuned amplifier, the tuned filter, etc. The controller may also be employed for analyzing and processing the measured RF signals.

According to a further aspect, the RF receiver module comprises a compass. The compass is an instrument which shows direction relative to the geographic cardinal directions and which is used for navigation and orientation. Additionally or alternatively, the RF receiver module comprises an altimeter or altitude meter. The altimeter is an instrument used to measure the altitude of an object above a fixed level. Additionally or alternatively, the RF receiver module comprises a GPS receiver. The Global Positioning System (GPS) is a satellite-based radio-navigation system that provides geolocation and time information to a GPS receiver. The compass, altimeter and GPS receiver provide to the user additional location information which is often useful for the measurement. Additionally or alternatively, the RF receiver module comprises a display. The display is used for displaying the measured and/or analysed RF signals and additionally to show and amend settings of the RF receiver.

According to a further aspect, the RF receiver module comprises an input device for allowing a user to input a user selective operation mode. For example, a user may input settings for the preselector circuit, the frequency band of interest, selected antenna, pre-amplifying, programming, identification data, etc.

According to a further aspect, the portable RF receiver module is part of a portable spectrum analyser.

According to a further aspect, the portable RF receiver module comprises a transmit circuit for providing at the standardized interface a RF transmit signal. As such, the RF receiver is then in fact a transceiver for as well receiving and transmitting RF signals and the antenna is configured to transmit RF signals.

According to a further aspect, at least one of the portable RF antennae is a directional antenna.

According to a further aspect, the antenna arrangement further comprising at least two RF antennae, which are integrated within the housing of the portable RF antenna.

According to a further aspect, the first standardized interface of the portable RF antenna comprises a first RF connector and the second standardized interface of the portable RF receiver module comprises a second RF connector wherein the second RF connector corresponds to the first RF connector.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
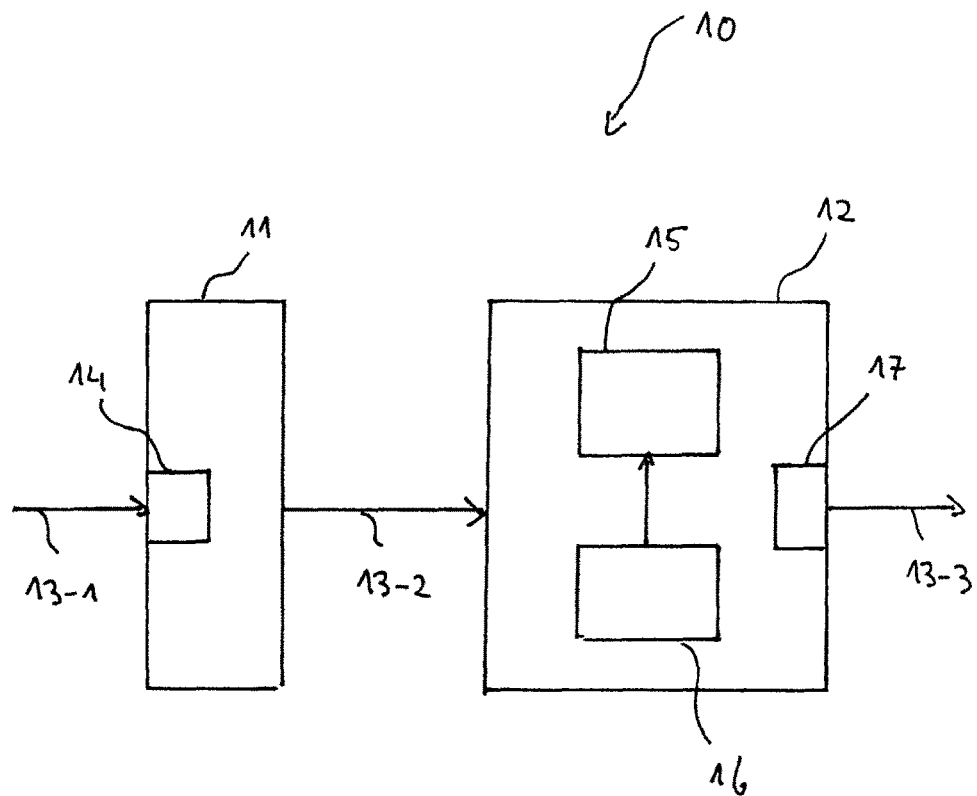
FIG. 1 shows a schematic block diagram of a first example of a portable RF receiver module.

The appended drawings are intended to provide a further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF EMBODIMENTS

FIG. 1 shows a schematic block diagram of a first example of a portable RF receiver module according to the present invention.

In FIG. 1, the RF receiver module is denoted by reference symbol 10. The RF receiver module 10 in FIG. 1 is portable and forms a stand-alone instrument which operates independently. The RF receiver module 10 comprises basically a standardized interface 11 and a preselector circuit 12.

The standardized interface 11 serves as an input interface and is configured to receive a RF signal 13-1 from an antenna. The standardized interface 11 comprises a RF connector 14 which is configured to allow as well an electrical connection and a mechanical quick attachment of the RF receiver module 10 to a corresponding standardized interface of an antenna (not shown in FIG. 1). The RF connector 14 is in particular a standardized RF coaxial connector 14, e.g. an N-type connector or a F-type connector. A coaxial RF connector 14 is an electrical connector designed to work at radio frequencies in the multi-megahertz range. RF connectors are designed to maintain the shielding that the coaxial design offers. Mechanically, they may provide a fastening mechanism, such as thread, bayonet, blind mate, and springs for a low ohmic electric contact.

The preselector circuit 12 is coupled to the standardized interface 11 in order to receive the received RF signals 13-2. The preselector circuit 12 comprises a filter 15 and a controllable selection apparatus 16. The filter 15 is for example a filterbank comprising an array of filter elements or one or more tuneable filters. The selection apparatus 16 is configured to allow a selection of a predefined filter characteristic of the filter 15 and to filter out predefined frequency bands of the received RF signals 13-2 such that at an output terminal 17 a filtered RF signal 13-3 is provided for further processing or analysing.

Figure 2:
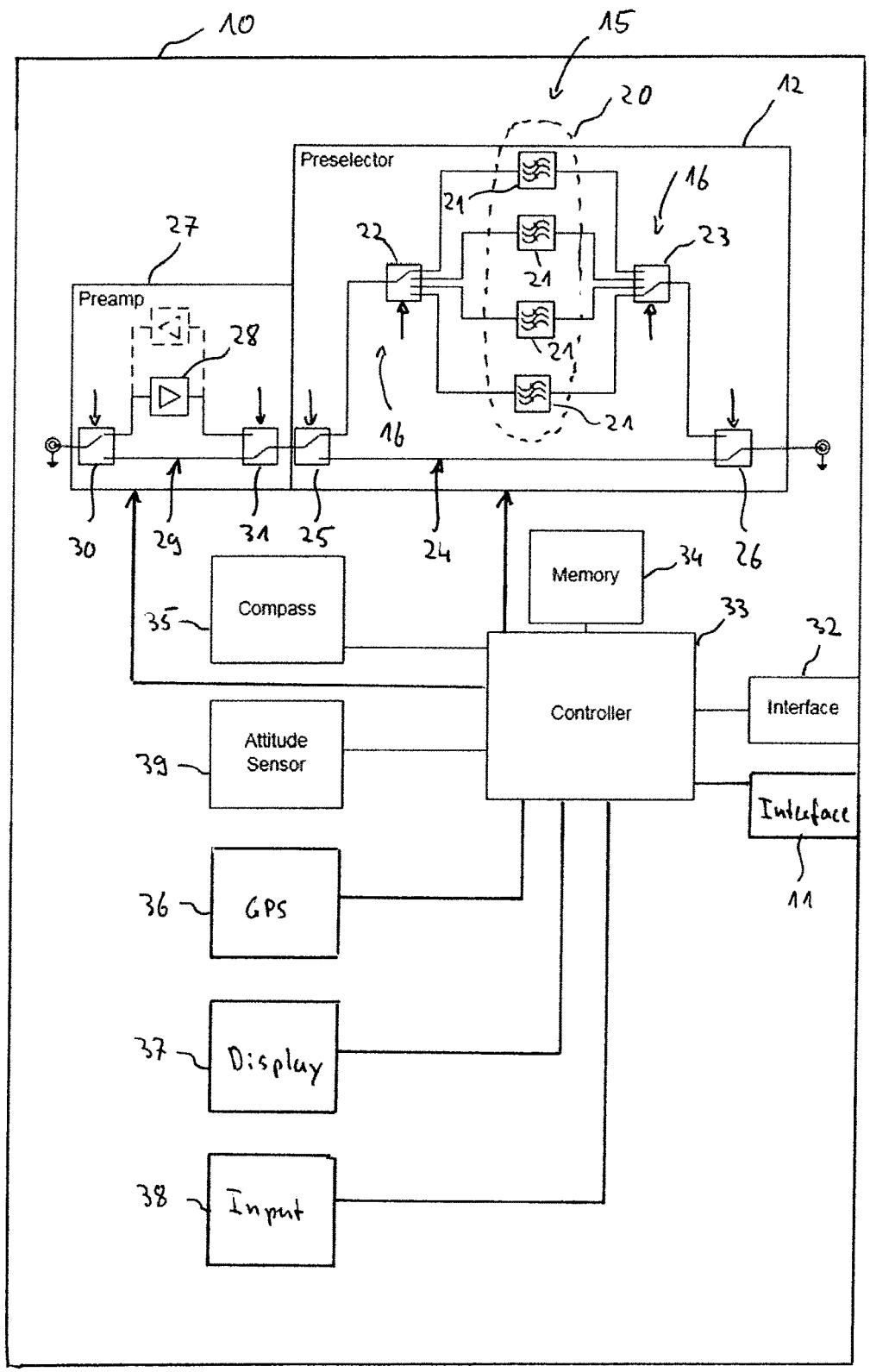
FIG. 2 shows a more detailed block diagram of a second example of a portable RF receiver module.

FIG. 2 shows a more detailed block diagram of a second example of a portable RF receiver module according to the present invention.

Here, the filter of the preselector circuit 12 is a filterbank 20 which comprises a plurality of filter elements 21. The filter elements 21 are arranged parallel to each other and arraywise. In the example of FIG. 2, the filter elements 21 are bandpass filters 21. Each of the bandpass filters are having a different transfer function, in particular different filter coefficients.

The selection apparatus 16 comprises a controllable multiplexer 22 which is arranged at an input side of the filterbank 20 and which is configured to activate one or more of the filter elements 21.

In a particularly preferred embodiment, the selection apparatus 16 further comprises a second multiplexer 23 which is arranged at an output side of the filterbank 20. The second multiplexer 23 is used to guarantee that deselected filter elements 21 do not have an impact on the filtered RF signal.

The preselector circuit 12 comprises a first bypass circuit 24. The first bypass circuit 24 is connected in parallel to the series connection of first multiplexers 22, filterbank 20 and second multiplexer 23. The first bypass circuit 24 is activated by means of suitable switches 25, 26 which are arranged such to enable bypassing the filterbank 20.

In another embodiment, the functionality of the switches 25, 26 may also be integrated within the corresponding multiplexers 22, 23 (not shown in FIG. 2).

An amplifier circuit 27 is arranged upstream the preselector circuit 12, i.e. between the standardized interface 11 and an input terminal of the preselector circuit 12. In the present example, the amplifier circuit 27 comprises at least one low noise amplifier (LNA) 28. A LNA is an electronic amplifier that amplifies a very low-power signal without significantly degrading its signal to noise ratio (SNR). As such, LNAs are designed to minimize additional noise.

Likewise, the amplifier circuit 27 comprises a second bypass circuit 29 which is connected in parallel to the amplifier 28. The second bypass circuit 24 is activated by means of suitable switches 30, 31 which are arranged such to enable bypassing the amplifier circuit 27.

The RF receiver module 10 further comprises a standardized output interface 32 which preferably is complementary (e.g. a female RF connector) to the standardized input interface 11 (e.g. a male RF connector).

The RF receiver module 10 further comprises a controller 33, a memory 34, a compass 35, a GPS receiver 36, a display 37, an input device 38 and an altimeter 39

The controller 33 maybe any programmable device, such as a microprocessor, microcomputer, DSP, FPGA, etc. The controller 33 is connected to the preselector circuit 12 and the amplifier circuit 27. The controller 33 is configured to control all operations of the portable RF module 12, in particular by selecting a bandwidth of interest. For this purpose the controller 33 suitably controls the multiplexers 22, 23 and switches 25, 26 such that one or more specific filter elements 21 of the filterbank 20 are selected for the filtering of a received RF signal. For this purpose the controller 33 feeds the incoming RF signal 13-2 to the amplifier circuit 27 using the switches 30, 31.

Depending on the selected operating mode, the controller 33 is configured to activate the first and/or the second bypass circuit 24, 29 in order to bypass the preselector circuit 12 and amplifier circuit 27, respectively.

The controller 33 is further connected to the memory 34. The memory may be any data storage device, such as a RAM, ROM, SRAM, DRAM, memory disk, memory card, USB flash drive, solid state drive, etc. The memory 34 is configured to store measurement specific information, in particular in connection with an ongoing RF measurement. Such measurement specific information are, for example, the user selection of the frequency band of interest. The measurement specific information may also be the type of antenna that is attached or attachable to the RF receiver module 10. The measurement specific information may also be relevant measurement information about the band and antenna selected. The measurement specific information may also comprise adjusting information, for example a factor that is used for adjustment of the measurement on the measurement instrument. Still other measurement specific information may be the results of a measurement, a predefined setting for the RF receiver module, a time stamp of the measurement, location of a measurement, the user identification, etc.

Depending on the specified operation mode of the RF receiver module 10, the controller 33 can read and use these information stored in the memory 34. Additionally, the controller 33 can also update the information stored in the memory 34 or write specific information into the memory 34.

A user may input user specific setting which then are used by the controller 33 and/or are written into the memory 34. For this purpose an input device 38 is provided, which is preferably connected to the controller 33 and/or the memory 34. The input device 38 may be a keypad, an integrated keyboard, a console, a touch screen or an array of buttons. The input device 38 may also be used for programming the controller 33.

The display 37 of the RF receiver module 10 is used for displaying measurement results, content of the memory, settings, etc. Preferably the display 37 is a touch screen and acts at the same time as an input device.

Figure 3:
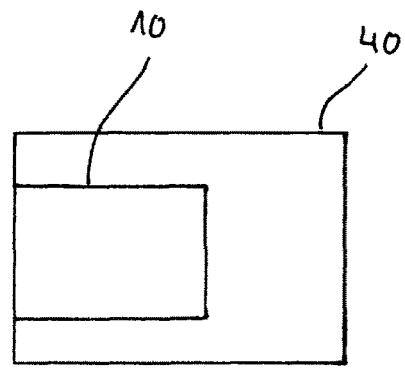
FIG. 3 shows a schematic block diagram of a portable spectrum analyser having a RF receiver module.

In FIG. 3, a portable spectrum analyser 40 is shown. The spectrum analyser 40 comprises an integrated RF receiver module 10, for example such as illustrated in FIG. 1 or 2. A spectrum analyzer 40 is an instrument that is configured to measure the magnitude of the RF input signal versus frequency within the full frequency range of the instrument. The primary use is to measure the power of the spectrum of known and unknown signals. As such it is possible for a user to directly see the analyzed received RF signal and if required to adapt the settings, exchange or select another antenna, etc.

The spectrum analyser 40 in FIG. 3 is a stand-alone instrument which operates independently.

Figure 4:
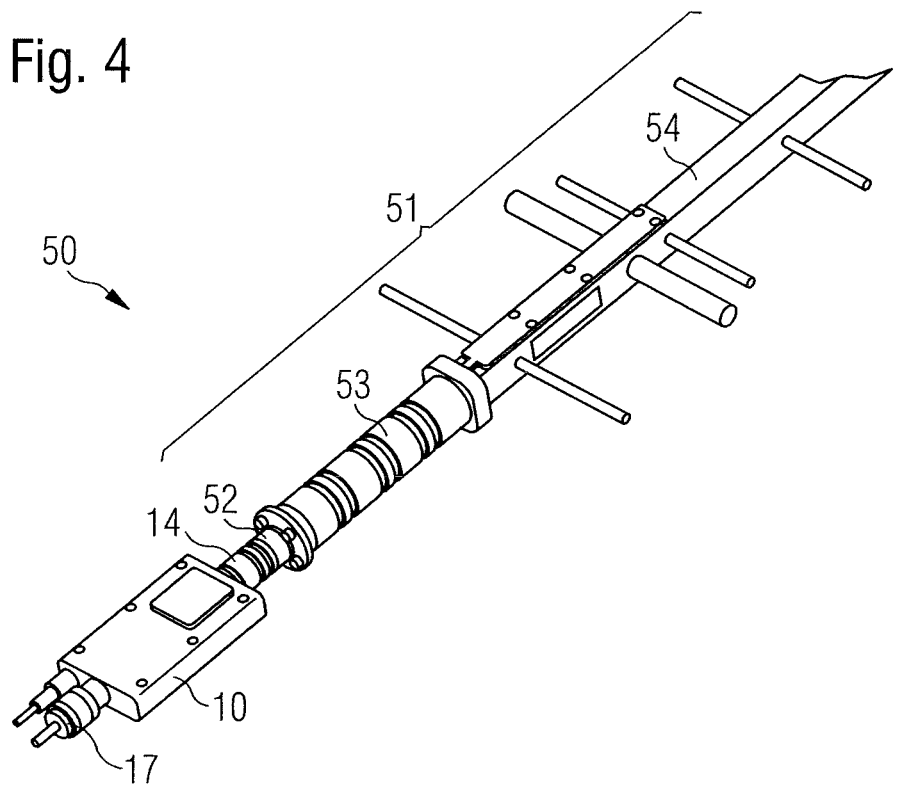
FIG. 4 shows a perspective view on an antenna arrangement.

FIG. 4 shows a perspective view on an antenna arrangement 50. The antenna arrangement 50 is portable and comprises a single portable antenna 51 and a portable RF receiver module 10, for example, a RF receiver module such as illustrated in FIG. 1 or 2.

The antenna 51 is in the present example a directional antenna. A directional antenna 51 or beam antenna is an antenna which radiates or receives greater power in specific directions allowing increased performance and reduced interference from unwanted sources. Preferably, the directional antenna 51 is a high gain antenna (HGA). A HGA is a directional antenna with a focused, narrow radiowave beam width. This narrow beam width allows more precise targeting of the radio signals.

In another embodiment, the directional antenna 51 may also be a low-gain antenna (LGA). A LGA is an omnidirectional antenna with a broad radiowave beam width that allows the signal to propagate reasonably and is thus more reliable regardless of terrain.

Additionally or alternatively, the directional antenna 51 comprises a loop antenna and/or a dipole antenna array. In another or additional embodiment, the directional antenna 51 comprises a logarithmic-periodic antenna.

The antenna 51 comprises a standardized interface 52 which includes a standardized RF connector 52. This standardized (male) RF connector 52 is configured such that a corresponding standardized (female) RF connector 11 may be coupled to it. This allows a quick connection of the RF receiver module 10 to the antenna 51, as it is shown in FIG. 4. The antenna 51 further comprises a handle 53 and an antenna portion 54.

According to additional embodiments, the antenna arrangement 50 may comprise at least two RF antennae (not shown in FIG. 4), e.g. at least two integrated antennae which are integrated within the housing of the antenna arrangement 50 or two modular antennae. For example, a first antenna is then configured for receiving a Very High Frequency (VHF) RF signal and a second antenna is configured for receiving a Ultra High Frequency (UHF) RF signal.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," etc., are used merely as labels, and are not intended to impose numerical requirements on or to establish a certain ranking of importance of their objects.

USED REFERENCE SYMBOLS

10 RF receiver module
11 standardized interface
12 preselector circuit
13-1 . . . 13-3 RF signals
14 RF connector
15 filter
16 selection apparatus
17 output terminal
20 filterbank
21 filter elements
22 first multiplexer
23 second multiplexer
24 first bypass circuit
25 switch
26 switch
27 amplifier circuit
28 low noise amplifier LNA
29 second bypass circuit
30 switch
31 switch
32 standardized output interface
33 controller
34 memory
35 compass
36 GPS receiver
37 display
38 input device
39 altimeter
40 portable spectrum analyser
50 antenna arrangement
51 portable antenna, directional antenna
52 standardized RF connector
53 handle
54 antenna portion

What we claim is:

1. A portable radio frequency (RF) receiver module, the portable RF receiver module comprising:
   a standardized interface for receiving a RF signal, which comprises a RF connector and which is configured to allow as well an electrical connection and a mechanical quick attachment of the portable RF receiver module to a corresponding standardized interface of an antenna;
   a preselector circuit which is coupled to the standardized interface for receiving RF signals and which comprises a filter and a selection apparatus, wherein the selection apparatus is configured to allow a selection of a predefined filter characteristic of the filter and to filter out predefined frequency bands of the received RF signals;
   an amplifier circuit for amplifying the received RF signal;
   a first switchable bypass circuit configured to bypass the preselector unit and a second switchable bypass circuit configured to bypass the amplifier circuit, wherein the first and second switchable bypass circuit are configured to bypass the preselector circuit and the amplifier circuit independently from each other.

2. The RF receiver module of claim 1, further comprising a memory which is coupled to at least one of the standardized interface and the preselector circuit, wherein the memory is configured to store measurement specific information in connection with a RF measurement after the portable RF receiver module is connected to an antenna for frequency measuring purposes.

3. The RF receiver module of claim 1, wherein the preselector circuit comprises a filterbank having an array of bandpass filters and wherein the selection apparatus comprises a switching circuit for selecting at least one of the bandpass filters in order to feed the received RF signal to the selected bandpass filters.

4. The RF receiver module of claim 3, wherein the preselector further comprises a measuring circuit which is configured to selectively measure specific frequency bands of the received RF signal and wherein the selection apparatus is further configured to allow a selection of at least one of the predefined filter characteristics based on information of the measured specific frequency bands.

5. The RF receiver module of claim 1, wherein the preselector circuit comprises a tuneable filter.

6. The RF receiver module of claim 1, wherein the amplifier circuit comprises at least one low noise amplifier (LNA).

7. The RF receiver module of claim 1, wherein the amplifier circuit is tuneable.

8. The RF receiver module of claim 1, wherein the amplifier circuit is connected upstream of the preselector circuit.

9. The RF receiver module of claim 1, wherein the RF connector of the standardized interface is a coaxial RF connector.

10. The RF receiver module of claim 1, further comprising a controller which is configured to control operation of the portable RF receiver module.

11. The RF receiver module of claim 10, wherein the controller is connected with control terminals of the preselector in order to switch the switching circuit.

12. The RF receiver module of claim 1, further comprising at least one of:
 a compass,
 an altimeter,
 a GPS receiver,
 a display.

13. The RF receiver module of claim 1, further comprising an input device for allowing a user to input a user selective operation mode.

14. The RF receiver module of claim 1, wherein the portable RF receiver module is part of a portable spectrum analyser.

15. The RF receiver module of claim 1, further comprising a transmit circuit for providing a RF transmit signal at the standardized interface.

16. A portable antenna arrangement, the antenna arrangement comprising:
 at least one portable RF antenna which is configured to receive over the air (OTA) RF signals and which is having a first standardized interface for providing the received RF signals; and
 a portable RF receiver module comprising: a second standardized interface; a preselector circuit which is coupled to the second standardized interface for receiving the provided RF signal and which comprises a plurality of filter elements and a selection apparatus, wherein the selection apparatus is arranged and configured to allow a selection of at least one of the filter elements for attenuating out predefined portions of the received RF signal;
 an amplifier circuit for amplifying the received RF signal;
 a first switchable bypass circuit configured to bypass the preselector unit and a second switchable bypass circuit configured to bypass the amplifier circuit, wherein the first and second switchable bypass circuit are configured to bypass the preselector circuit and the amplifier circuit independently from each other;
 wherein the portable RF receiver module is attached to the antenna and electrically connected to the antenna via their standardized interfaces.

17. The antenna arrangement of claim 16, wherein at least one of the portable RF antennae is a directional antenna.

18. The antenna arrangement of claim 16, further comprising at least two integrated RF antennae.

19. The antenna arrangement of claim 16, wherein the first standardized interface of the portable RF antenna comprises a first RF connector and wherein the second standardized interface of the portable RF receiver module comprises a second RF connector which corresponds to the first RF connector.

* * * * *